United States Patent [19]

du Manoir de Juaye et al.

[11] Patent Number: 4,457,496
[45] Date of Patent: Jul. 3, 1984

[54] FILTRATION BLOCK FOR LIQUID METALS AND ALLOYS, WITH A MECHANICAL AND PHYSICAL-CHEMICAL EFFECT

[75] Inventors: Pierre du Manoir de Juaye, Vimines Cognin; Pierre Guerit, Chambery; Gilbert Pollet, LaRavoire; Marc Vassiliadis, Saint Germain en Laye, all of France

[73] Assignee: Servimetal, France

[21] Appl. No.: 366,848

[22] Filed: Apr. 9, 1982

Related U.S. Application Data

[63] Continuation of Ser. No. 111,905, Jan. 14, 1980, abandoned.

[51] Int. Cl.$^3$ .............................................. C22B 21/06
[52] U.S. Cl. .................................. 266/227; 210/510.1; 75/67 A; 75/68 R; 501/95; 501/108; 501/123; 501/151
[58] Field of Search ..................... 75/68 R; 266/227; 210/510

[56] References Cited

U.S. PATENT DOCUMENTS

| | | | |
|---|---|---|---|
| 3,907,962 | 9/1975 | Ogiso | 75/68 R |
| 4,024,056 | 5/1977 | Yarwood et al. | 75/68 R |
| 4,258,099 | 3/1981 | Narumiya | 75/68 R |
| 4,265,659 | 5/1981 | Blome | 75/68 R |
| 4,277,281 | 7/1981 | Weber et al. | 266/227 |

FOREIGN PATENT DOCUMENTS 1367069  9/1974  United Kingdom ............ 75/93 AC

*Primary Examiner*—M. J. Andrews
*Attorney, Agent, or Firm*—McDougall, Hersh & Scott

[57] ABSTRACT

The invention concerns a filtration block for liquid alloys and metals, with a mechanical and physical-chemical effect.

Agglomerating, for example by sintering, elements of an active mineral compound based on fluorides, results in a porous structure with a high degree of permeability, which acts both by a mechanical filtration effect and by a washing action in respect of the metal under the action of the active mineral compound which acts as a flux and provides for trapping inclusions.

Use for the final purification of aluminium, aluminium-base alloys, magnesium and magnesium-base alloys.

7 Claims, No Drawings

FILTRATION BLOCK FOR LIQUID METALS AND ALLOYS, WITH A MECHANICAL AND PHYSICAL-CHEMICAL EFFECT

This is a continuation of application Ser. No. 111,905, filed Jan. 14, 1980 now abandoned.

The present invention concerns a filtration block with a mechanical and physical-chemical effect, for liquid metals and in particular for aluminium and aluminium base alloys, magnesium and magnesium base alloys.

Both in the foundry casting of parts and in the semi-continuous casting of plates, billets or ingots and in continuous casting, it has been recognised that, in order to produce sound parts which are free from defects, it is necessary to treat the metal in order to remove therefrom impurities and in particular inclusions which would impair the properties of the cast components. These operations may be purely mechanical in nature, such as filtration, or of a physical-chemical nature such as bringing the metal into contact with fluxes.

In practice, the treatment operation comprises mechanical filtration and a washing operation by means of a flux which in most cases comprises one or more molten alkali metal and alkaline-earth metal halides, which facilitates wetting the inclusions and combining them together in the form of dross.

The inclusions which are not wetted by the metal and which the wetted by the fluxes, which arrive at a liquid metal-liquid flux interface which is thus formed, are trapped at the interface and pass into the liquid flux. They are eradicated from the liquid metal in the course of the washing operation.

A large number of patents disclose processes and apparatus which provide both for washing the metal by a flux and filtration thereof through porous materials.

The following may be mentioned in particular: U.S. Pat. Nos. 2,863,558, 3,006,473, 3,010,712, 3,025,155, 3,039,864 3,172,757, 3,821,238, 3,737,305 in the name of ALCOA; British Pat. No. 1 266 500 and French Pat. No. 2 061 246 to BACO (British Aluminium Company); French Pat. Nos. 1 254 899 and 1258 674 and British Pat. No. 1 148 344 to FOSECO; U.S. Pat. No. 3,227,547 to UNION CARBIDE and, more recently, U.S. Pat. Nos. 3,893,917, 3,962,081, 3,947,363 and 4,075,303, to ALUSUISSE which describe porous ceramic materials for filtering liquid aluminium.

These processes have been considered satisfactory for many years. At the present time however, the requirements made by the aeronautical industry, for thin strips for packaging, for thin sheets and for fine wires put the producers of semi-manufactured articles of light alloys and metals under an obligation continuously to improve the quality thereof, especially as the refinements made in respect of analytical methods have shown that microscopic inclusions which hitherto were considered negligible could impair certain mechanical characteristics and could increase the rejection rate and could sometimes render useless and even harmful certain extreme heat treatments which are carried out in the vicinity of the melting point of the eutectic constituents of the alloys.

The present invention makes it possible to attain a degree of cleanliness of the metal, which is markedly higher than that achieved with the known processes.

The present invention concerns a filtration block for liquid alloys and metals, with a mechanical and physical-chemical effect, having a structure with open pores, which is formed by the agglomeration of elements, of which at least the outside part is formed by an active mineral compound, the melting points of the elements and the active mineral compound being higher than the melting point of the metal to be filtered and in practice being higher than the temperature at which the metal to be filtered will be fed to the filtration block.

In the following specification, the expressions set out hereinbefore will bear the definitions specified: 'metal to be filtered': the metal or alloy which is intended to undergo the filtration treatment on the block according to the invention; 'active mineral compound': a mineral salt, a mixture or a combination of mineral salts, acting a flux by acting by a chemical and/or physical-chemical effect on the various impurities and inclusions present in the metals to be treated, its action finally resulting in removal of the inclusions and impurities from the filtered metal; 'agglomeration': any process which makes it possible to form a porous structure which is mechanically stable, at the filtration temperature, from the elements of active mineral compound; and 'elements': the elements, the agglomeration of which forms the filter block, irrespective of the form thereof: grains of regular geometrical shape, crystals, grains of irregular fracture, grains of elongate shape and even needle-shaped grains, small rods or sticks, or fibres of a circular or any section.

The invention also concerns a process for the production of an elementary filtration block for liquid metals, with a mechanical and physical-chemical effect, characterised by agglomerating so as to form an open-pore structure, elements of which at least the outside part comprises an active mineral compound.

The general idea of the present invention is to combine in a single structure a purely mechanical filtration action which makes it possible to retain the inclusions and other foreign elements which are greater in size than the size of the passages in the filter, and a physical-chemical purification action under the effect of an active mineral compound which acts as a flux which makes it possibe to trap the inclusion at the liquid metal-flux interface. The applicants have found that this effect of physical-chemical purification by means of a flux under some circumstances, was at least as effective with a solid flux in grain form as with a liquid flux, as was practised hitherto, such conditions being in particular the provision of a large contact area between the solid flux grains and the liquid metal to be treated. The applicants also found that it was possible for the solid flux elements to be agglomerated, for example by sintering, thus to produce porous materials which have both the shapes and the sizes of open pores and passages to permit mechanical filtration, in particular by trapping inclusions, by virtue of the distorted shape of the passages formed between said elements and by virtue of a large contact area with the liquid metal, permitting physical-chemical purification. It was found that the fluxes which are most suitable for the agglomeration step and which moreover have a higher melting point than the temperature at which the metals and alloys to be purified are supplied were essentially mineral fluorides and in particular alkali and alkaline-earth metal fluorides, and fluorides of magnesium and aluminium. Although the use of sodium salts is theoretically possible, such use however is to be rejected when treating aluminium and most of the aluminium-base alloys, as it gives rise to the danger of introducing sodium into the filtered metal; it is known that this element has an unfavourable influence in particular on hypersilicon-bearing Al-Mg and Al-Si alloys, even in very low levels of concentration.

Of all the possible combinations as between the fluorides referred to above, binary, ternary or even quaternary combinations whose melting point will preferably be more than 800° C. may be mentioned.

This is the case for example with the following compositions which are given as percentages by weight, by way of non-limiting example:

| | | | | |
|---|---|---|---|---|
| $CaF_2$ | (45%) | $MgF_2$ | (55%) | melting point 980° C. |
| $AlF_3$ | (8.5%) | KF | (91.5%) | melting point 820° C. |
| $AlF_3$ | (41%) | $CaF_2$ | (59%) | melting point 840° C. |
| $BaF_2$ | (85%) | $MgF_2$ | (15%) | melting point 910° C. |
| $BaF_2$ | (30%) | $CaF_2$ | (70%) | melting point 1050° C. |
| $CaF_2$ | (49%) | $MgF_2$ | (49%) | melting point 950° C. |
| | | LiF | (2%) | |

The nature and the form of the elements forming the filtration block according to the invention may also vary within fairly wide limits.

Such elements may be homogeneous, that is to say, may be totally formed by the active mineral compound, or they may be heterogeneous, that is to say, formed by an inert substrate covered with the active mineral compound, or a porous inert substrate impregnated with active mineral compound. The filtration block, taken as a unit, may comprise elements of the same nature (homogeneous or heterogeneous) or a mixture of elements of different natures.

The inert substrate may be selected from mineral compounds which do not react with the metals to be treated. This is the case in particular with electrofused alumina (corindon), electrofused alumina-zirconia compounds (corindons with zirconia) and different silico-aluminous products and silicon carbide.

Carbonaceous substances such as graphite or certain cokes can also be used. Other compounds such as nitrides or oxynitrides of boron or silicon could be used, but their high price makes them less attractive.

The shape and the size of the elements is also an important factor for carrying the invention into effect. The shape of the elements determines the active surface area of the filtration block and the shape of the passages. The active surface area which is minimal when using spherical grains is increased by using tabular or needle-shaped grains or grains produced by crushing balls or other simple geometrical shapes. Using elements in the form of small rods or sticks or elongate fibres wherein the ratio between the length and the mean transverse dimension may be from 5 to 200 for example makes it possible to produce filtration blocks having a felt-like structure which is highly effective by virtue of the large active surface area, the particularly distorted shape of the passage and the high degree of porosity inherent in this type of interlacement structure.

Porous elements with a heterogeneous structure can be produced in known manner by agglomeration of a stable compound, for example alumina, with a hot-decomposable or sublimable compound which is removed in the hot agglomeration step or in the sintering step, and then by impregnation with the molten active mineral compound.

Likewise, porous elements with a homogeneous structure may be produced by mixing the active mineral compound with a product which can be eliminated by heat, by volatilisation or by pyrolysis in the agglomeration step.

The size of the elements and their granulometric distribution is one of the factors which determines porosity and permeability of the filter, that is to say, in practice, its hourly filtration capacity.

It has been found for example that a filtration block according to the invention which comprises elements in the form of grains measuring from 4 to 8 mm, in a thickness of 40 mm, had a capacity for filtering liquid aluminium at about 750° C., which was of the order of 12 kg per square cm of surface area and per hour, with a pressure drop of from 10 to 20 mm of liquid aluminium. The porosity of such a filter is approximately 40%.

It is possible to use elements of much smaller sizes, down to a few tenths of a micrometer, provided that the agglomeration process makes it possible to achieve a sufficient degree of permeability to provide the high filtration flow rates required by industrial procedures.

Starting from elements in the form of small rods or sticks measuring 1 mm in diameter and 15 mm in length, agglomeration results in a felt-like structure wherein the degree of porosity reaches from 80 to 90% and the capacity for filtration of liquid aluminium at a temperature of 750° C. is about 25 kg per square centimeter of surface area and per hour, at a thickness of 50 mm.

The filtration blocks according to the invention being formed by the agglomeration of elements, any shapes and dimensions required by the different uses for which they are intended may be imparted thereto: plates of simple geometrical or relatively complex shapes, cylinders, tubes, crucible configurations, plugs or nozzles, which can be positioned above a ladle, in a casting gate or at the inlet of a mould. In the latter case, it is possible to provide for the final treatment of the metal at the very last moment before it is shaped, at a position at which all causes of pollution and outside fouling have ceased to exist, thus to ensure that the cast or moulded components are of a quality which has been impossible to achieve hitherto.

The process for production of the filtration blocks may be carried into effect in a number of different forms, according to the nature of the elementary grains.

A first embodiment of the process comprises melting the active mineral compound, casting it in the form of a thin plate which is a few millimeters in thickness, crushing it and calibrating the elements by sieving to the desired granulometry.

The elements are then put into a mould and heated in a dry atmosphere to a temperature which is slightly lower than the melting temperature of the activer mineral compound thereby to cause sintering thereof. The sintering operation is effected without pressure. It is also possible to apply a moderate pressure during the sintering operation, with a correlated reduction in the temperature and/or the duration of the operation. Generally, agglomeration by sintering is carried out in a dry atmosphere, avoiding any contact with a flame, at a temperature which is from 5 to 150° approximately lower than the melting point of the mineral compound, for a period of the time between 5 minutes and 1 to 2 hours.

The resulting porous structure is highly stable and resistant mechanically.

An alternative form of the production process comprises compressing or pelleting the mixture of mineral compounds and then crushing the compressed products or pellets in order to produce the elements which are calibrated by sieving and agglomerated by sintering as described hereinbefore.

Elements in the form of small rods or elongate fibres may be produced by different known processes. By way of example, mention may be made of gravity casting the molten active mineral compound through a graphite die comprising a plurality of die orifices calibrated at the desired diameter, followed by rapid cooling, or drawing through a die a paste formed from the active mineral compound in the form of powder or in the form of fine crystals and a bindng agent which can be removed in the hot condition by evaporation or by pyrolysis, in the agglomeration step. In the latter case, the resulting product is fibres or rods with a porous structure.

When heterogeneous elements are used, a number of different forms can be envisaged, depending on whether the elements are or are not porous. The general method comprises coating or impregnating the elements with active mineral compound, for example by immersion in the compound in the molten state, and then, after cooling, effecting a fresh crushing step following by sieving for calibration purposes, shaping and sintering.

When the starting material is an active mineral compound in the form of grains of very small sizes, a few tenths of a micrometer to one or two millimeters, in order to produce a structure which has a sufficient degree of porosity it is possible to operate in accordance with known processes to produce a preliminary mixture with a binding agent which will be removed in the agglomeration step, for example a sublimable organic compound such as camphor, naphthalene, or hexachloroethane or a pyrolysable compound such as polyethylene or polyurethane.

Finally, another alternative form comprises firstly preparing by means of any known process a porous or spongy structure with open pores, of inert material, and impregnating it with an active mineral compound. It is possible for example to agglomerate by sintering grains of alumina so as to produce a porous structure, then impregnating the structure by immersion in a bath of molten active mineral compound, and possibly removing the excess of mineral compound by vibration, suction, centrifuging, etc. It is also possible, in known manner, to start from a spongy element in the form of an organic substance which can be removed or destroyed by heat, for example expanded polyurethane foam, and to impregnate it by immersion in a slop comprising the active mineral compound and a solvent or a dispersant of aqueous or non-aqueous nature, and to carry out a baking operation which causes both destruction of the polyurethane foam and agglomeration of the active mineral compound. This last-mentioned process which is used for forming porous ceramic structures was described in particular in U.S. Pat. Nos. 3,090,094 and 3,097,930.

The following examples provide further details, in non-limiting manner, in respect of some methods of producing filtration blocks according to the invention.

EXAMPLE 1

A binary mixture comprising 50% by weight of $MgF_2$ and 50% by weight of $CaF_2$ was melted at a temperature of about 1000° C. The liquid was cast in the form of a plate measuring 5 mm in thickness. After cooling, the plate was crushed and the crushed grains were calibrated, by sieving, at from 4 to 8 mm. 2% by weight of LiF was added to the calibrated grains, and intimately mixed by mixing over a prolonged period. The mixture was put in a mould in the shape of a disc measuring 190 mm in diameter and 40 mm in thickness, vibrated and compacted, and then sintered by being held at a temperature of 950° C. for 20 minutes.

After cooling, the resulting product was a disc having a degree of porosity of about 40%, with a filtration capacity of 3.6 tonnes per hour of liquid aluminium at about 750° C., with a pressure drop of about 15 mm of liquid aluminium.

EXAMPLE 2

A ternary mixture comprising $CaF_2$: 49% by weight, $MgF_2$: 49% by weight, and LiF: 2% by weight, was melted at a temperature of about 1000° C. Operation was effected as in Example 1, the grains being calibrated at from 5 to 8 mm, the mould measuring $200 \times 200 \times 40$ mm and the sintering operation being carried out by holding a temperature of 930° C. for 35 minutes. This process resulted in a filtration block having a degree of porosity of 40% and a filtration capacity of 5 tonnes per hour of liquid aluminium at about 750° C.

EXAMPLE 3

Alumina which is referred to as 'tabular' alumina, with grains measuring from 5 to 6 mm, was impregnated for a period of 30 minutes in a bath comprising a ternary mixture of 49% by weight of $CaF_2$, 49% by weight of $MgF_2$ and 2% by weight of LiF at a temperature of 1050° C. The alumina was then removed from the molten bath, drained, cooled, crushed and again calibrated at from 5 to 6 mm.

The product was then shaped and sintered under the same conditions as in Example 2.

The resulting product was a filtration block with a degree of porosity of about 40% and a filtration capacity of 4.6 tonnes per hour of liquid aluminium at about 750° C.

EXAMPLE 4

Small rods or sticks with a section of about 1 mm and from 8 to 20 mm in length were prepared by casting a molten mixture of 49% by weight of $MgF_2$, 49% by weight of $CaF_2$ and 2% by weight of LiF through a graphite die comprising holes which are 1 mm in diameter, followed by rapid cooling in a stream of dry air.

The small rods were disposed loose in a graphite mould in the form of a square plate measuring $200 \times 200 \times 40$ mm; vibration was applied in order to cause the rods to be interlaced, the rods then being agglomerated by sintering at a temperature of 920° C. for 30 minutes. The resulting product was a filtration block with a porosity of 85% and a filtration capacity of 10 tonnes per hour of liquid aluminium at about 750° C.

EXAMPLE 5

A filter block produced as in the preceding Example and in the form of a thick disc measuring 60 mm in thickness and 40 mm in diameter was placed in the upper part of a feed tube of a low-pressure casting machine; the active mineral compound was the ternary mixture comprising 85% by weight of $BaF_2$, 13% by weight of $MgF_2$ and 2% by weight of $CaF_2$, and the alloy treated was an alloy A-S 7G (an aluminium-base alloy containing about 7% of silicon and about 0.9% of magnesium); a very marked improvement was found with regard to the metallurgical soundness of the parts produced.

Using the filtration blocks according to the invention makes it possible to prodce aluminium, magnesium and alloys based on one or other of these metals, in a degree of purity which complies with the highest requirements made by the users thereof (aeronautical industry, fine wires, thin sheets for encasing and capacitors).

Use of the filtration blocks according to the invention also permits treatment of other metals and alloys whose melting points are compatible with the melting point of the active mineral compound such as lead, tin, zinc, copper or alloys with such metals as their base. If necessary, the composition of the active mineral compound may be modified by adding other substances such as borates or carbonates.

The filtration blocks also have a very high degree of mechanical strength and a very high degree of cohesion. In continuous prolonged service, no rupture or loss or breakdown in cohesion of elementary grains or any particles whatever has ever been observed.

Before being put into service, the blocks must preferably be pre-heated to a temperature close to that of the metal to be filtered, by any means other than direct contact with a flame. In the event of a stoppage and, after cooling, the resumption of operation with the blocks is effected in the same manner by simply reheating the blocks.

We claim:

1. A solid, porous filtration block for purification of liquid alloys and metals by the combination of simultaneous mechanical and physical-chemical effect, consisting essentially of a plurality of solid elements agglomerated by sintering into a structurally strong, composite solid block with open pores between the elements forming the agglomerated filtering block, in which at least the outside surface portions of the agglomerated elements are formed by an active mineral fluoride, the melting points of the elements and the active mineral fluoride being higher than the melting temperature of the metal to be treated.

2. A filtration block according to claim 1 characterised in that the mineral fluoride comprises at least one mineral fluoride salt selected from alkali and alkaline-earth metal fluorides, and fluorides of magnesium and aluminium.

3. A filtration block according to claim 1 characterised in that the melting points of the elements and the active mineral fluoride are higher than the temperature at which the metal or alloy to be filtered is fed to the filtration block.

4. A filtration block according to any one of claims 1 to 3 characterised in that it is formed by the interlacing of agglomerated elements in the form of small rods or sticks wherein the ratio between their length and their mean transverse dimension is from 5 to 200.

5. A filtration block according to claim 1 characterised in that the elements thereof are of a homogeneous chemical composition.

6. A filtration block according to claim 1 characterised in that the elements thereof comprise an inert core coated with active mineral fluoride.

7. A solid porous block as claimed in claim 1 for purification of aluminum and aluminum based alloys, in which the mineral fluoride is substantially free of alkali metal values.

* * * * *